(12) United States Patent
Utsumi et al.

(10) Patent No.: US 9,459,614 B2
(45) Date of Patent: Oct. 4, 2016

(54) MACHINING CONDITION ESTIMATING APPARATUS AND MACHINING CONDITION ESTIMATING METHOD

(71) Applicant: Hitachi Metals, Ltd., Minato-ku, Tokyo (JP)

(72) Inventors: Koji Utsumi, Tokyo (JP); Shigeyoshi Fujihara, Tokyo (JP); Tadashi Kitamura, Tokyo (JP); Kenichi Inoue, Tokyo (JP); Shinji Kayama, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 425 days.

(21) Appl. No.: 14/155,751

(22) Filed: Jan. 15, 2014

(65) Prior Publication Data

US 2014/0200709 A1  Jul. 17, 2014

(30) Foreign Application Priority Data

Jan. 17, 2013  (JP) ................................. 2013-006275

(51) Int. Cl.
*G05B 19/4097* (2006.01)
*G05B 19/4093* (2006.01)
*G06F 19/00* (2011.01)
*G05B 19/4065* (2006.01)

(52) U.S. Cl.
CPC . *G05B 19/4065* (2013.01); *G05B 2219/49225* (2013.01)

(58) Field of Classification Search
CPC ................. Y02P 90/265; D05B 11/00; G05B 19/40937; G05B 19/4065; G05B 19/4163; G05B 19/4097; G05B 2219/45036
See application file for complete search history.

(56) References Cited

U.S. PATENT DOCUMENTS

| | | | |
|---|---|---|---|
| 6,766,216 B2* | 7/2004 | Erichsen | B24C 1/045 700/159 |
| 8,295,972 B2* | 10/2012 | Coleman | G05B 19/40937 700/173 |
| 8,538,574 B2* | 9/2013 | Hahn | G05B 19/40937 700/159 |
| 9,067,281 B2* | 6/2015 | Beutler | B23K 26/0876 |
| 2009/0064911 A1* | 3/2009 | Oxley | D05B 11/00 112/2.1 |
| 2012/0232687 A1* | 9/2012 | Mikkelsen | G05B 19/40937 700/122 |
| 2014/0180465 A1* | 6/2014 | Nakano | G05B 19/4097 700/160 |
| 2015/0127139 A1* | 5/2015 | Bolin | G05B 19/4065 700/173 |
| 2015/0205289 A1* | 7/2015 | Henning | G05B 19/4097 700/98 |
| 2015/0205293 A1* | 7/2015 | Henning | G05B 19/4097 700/97 |

FOREIGN PATENT DOCUMENTS

| | | |
|---|---|---|
| JP | 2008-221454 A | 9/2008 |
| JP | 2011-230206 A | 11/2011 |

OTHER PUBLICATIONS

Mueller et al., constructable: Interactive Construction of Functional Mechanical Devices, May 2013, 4 pages.*

* cited by examiner

*Primary Examiner* — Thuy Dao
(74) *Attorney, Agent, or Firm* — Crowell & Moring LLP (57) ABSTRACT

A machining condition estimating apparatus, and method, for estimating a machining condition to suppress a wear volume of a tool when conducting cutting work in a work machine are provided. For example, an analysis model presenting shapes of a tool and cutting material, may be defined, to be a target of analysis, and an initial value for use of analysis and change volume of the machining condition parameter as analysis parameters may be set up. Coordinates for tool and cutting material contact may be calculated. Moreover, a boundary movement rate, a maximum contact length, and a contact angle are calculated. A machining condition presented by the analysis parameter may also be searched and outputted.

10 Claims, 11 Drawing Sheets

MACHINING CONDITION ESTIMATING APPARATUS AND MACHINING CONDITION ESTIMATING METHOD

CLAIM OF PRIORITY

The present application claims priority from Japanese Patent Application JP2013-006275 filed on Jan. 17, 2013, the content of which is hereby incorporated by reference into this application.

BACKGROUND OF THE INVENTION

1. Technical Field

The present invention relates to a machining condition estimating apparatus for estimating a machining condition for suppressing wear of a tool in machining on a curved surface with applying a multi-axial work machine, and a machining condition estimating method for the same.

2. Background Art

A background technology of the present technical field is already known in Japanese Patent Laid-Open No. 2008-221454, for example. In this publication is described "to provide a method for estimating wear of a tool, so as to enable to estimate an amount of wear of the tool at high accuracy before machining, from a low-speed cutting region to a high-speed cutting region. Since the amount of wear of the tool is estimated from an estimation equation having a term for showing an influence to abrasive wear due to a hard inclusion within a material to be cut (hereinafter, "cutting material") and a term for showing an influence to thermal diffusion wear due to the hard inclusion within the cutting material, then it is possible to estimate the amount of wear of the tool, by taking the abrasive wear, which generates mainly in the low-speed cutting region or a middle-speed cutting region, and also the thermal diffusion wear, which generates mainly the high-speed cutting region, into the consideration thereof" (see Abstract). According to the Patent Document mentioned above, it is possible to estimate the amount of wear of the tool, by collecting data necessary to an equation 3 of the Patent Document mentioned above, and to estimate a machining condition for enabling suppression of the wear of the tool.

Also, in recent years, accompanying with development of the work machines and data collecting equipment, a detecting apparatus is invented for conducting determination of a life-time of the tool under the condition of cutting work, with conducting real-time observation of a machining load from working current of a main shaft of the work machine, etc., which can be obtained from the work machine during the time of cutting work. An example of this is already known in Japanese Patent Laid-Open No. 2011-230206. In this publication is described "to provide a tool life-time detecting method for enabling to detect reaching to the life-time of the tool at high accuracy, and also a tool life-time detecting apparatus. With applying numerical information relating to a specific cutting force, which is measured in advance upon a work piece to be machined this time, and numerical information relating to a machining load value and a specific cutting force corresponding to this, which were already measured on a work piece being machined before that, a machining load value is calculated as an estimated load value, which can be estimated to generate when machining a work piece to be machined this time, and this estimated load value is compared with a reference load value to be a reference for determination of the life-time of the tool, so that it is detected that the tool mentioned above reaches to the life-time when the estimated load value mentioned above exceeds that reference load value." In Patent Document of the latter is described a method of calculating a threshold value for a value of a main shaft of the work machine, which can be estimated when the tool reaches to the life-time thereof, in advance, and comparing the load value of the main shaft, which is detected in an actual machining, to the threshold value mentioned above; thereby detecting that the tool reaches to the life-time thereof when it exceeds the threshold value mentioned above.

BRIEF SUMMARY OF THE INVENTION

Figure 2A:
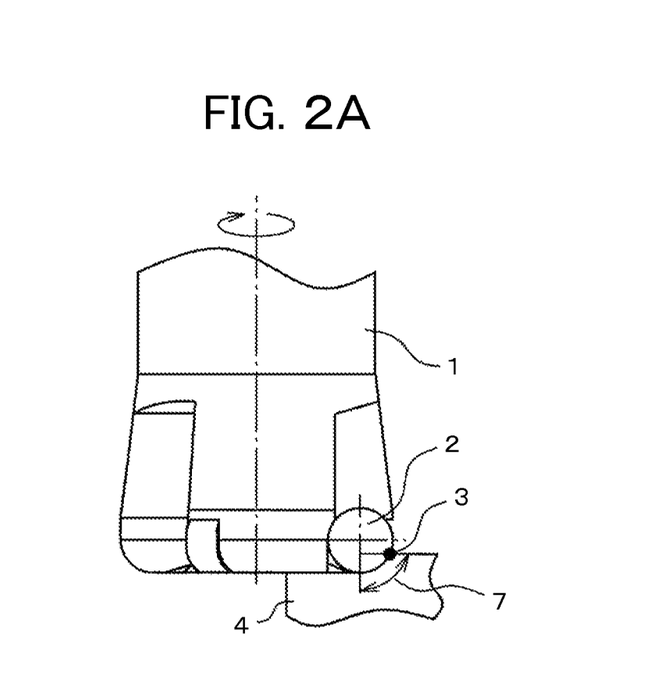
FIGS. 2A and 2B are perspective views for showing an example of boundary wears on a blade of a tool.
Figure 2B:
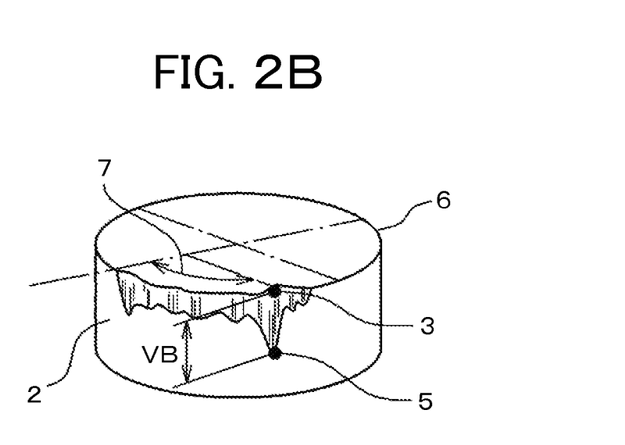

In manufacturing of products through cutting work, it is one of important problems to be dissolved to reduce a production cost by lowering a number of tools to be applied, as well as, to increase productivity through estimating the life-time of the tool from the wear thereof, thereby to set up an appropriate machining condition. Although the wear of the tool includes a several number of wearing modes, in general; however, in particular, when cutting a cutting material 4, being made of a heat resisting alloy, such as, Ni-group alloys, etc., while rotating it, with using a blade 2 attached on a tool 1, for example, as is shown in FIGS. 2A and 2B, many problems are generated in a progress of boundary wears on a boundary portion 3 on a side surface of the blade 2, within a region of a contact angle 7 where a blade edge 6, being a blade edge portion of the tool, is in contact with the cutting material 4, and since the Ni-group alloy is a material of hardness of cutting, the wear of the tool progresses, extremely, comparing to the case of cutting a material of steel, etc., and thereby shortening the life-time of the tool, i.e., bringing about a problem of estimation of the wears of the tool and also selection of the machining condition for achieving a long life-time upon basis of the estimation mentioned above.

For dissolving such problems as mentioned above, although such invention is accomplished, as is disclosed in the Patent Document 1 mentioned above; however, for calculating the life-time of the tool before machining a product, upon basis of an equation for estimating the life-time of the tool, which is described in the Patent Document 1 mentioned above, a large volume of database is needed, in advance. In more details, when building up the database, it is necessary to calculates coefficients of the equation for estimating the life-time, while conducting plural numbers of cutting tests, measuring the amount of wear of the tool, and obtaining cutting temperature through measurement or analysis, as well, and this brings about a lot of works for conducting or completing a series of those works. In addition thereto, when changing is made on the cutting material or a kind of the blade of the tool, it is necessary to obtain such database as mentioned above, again, for each combination of the cutting material and the kind of the blade of the tool mentioned above, and this, i.e., building up the database mentioned above for each combination of the tool and the cutting material, needs a great effort and costs, for a limited time and facilities of a manufacturing field. Further, when trying to apply the teaching of the Patent Document 1 mentioned above into the machining of a curved surface with using a 5-shafts work machine, since a contacting condition between the tool and the cutting material changes variously, in machining of the curved surface, and this affects an influence on the amount of the wear of the tool, therefore it takes a lot of time to build up such database as mentioned above for all or a part of the contacting conditions mentioned above, and this is not practical.

Also, though a method is invented for reducing a loss cost due to a defective product accompanying with deficit of the tool during the time of the machining, while observing the life-time of the tool from the cutting load during the time of the machining, as is disclosed in the Patent Document 2; however, with such method of the Patent Document 2 mentioned above, it is impossible to estimate a machining condition for obtaining a long life-time in advance.

On the other hand, since a recommend machining condition is determined, generally, by a maker of the tool, to have a certain degree of range fitting to a cutting material and a material of the tool, then in many cases, the machining condition is studied within the range mentioned above, in the manufacturing field. Because of such reasons mentioned above, it takes a great labor to estimate an absolute value of wear of the tool in advance, and it is difficult to estimate the absolute value, in particular, in such a machining mode that the tool applying the 5-shafts work machine therein is in contact with the cutting material, complexly. For this reason, since the contact condition between the tool and the cutting material affects an influence upon the wear of the tool, in particular, when machining the curved surface by means of the 5-shafts work machine, there is a problem to be dissolved, i.e., wishing to make the machining condition selectable, while estimating a long-life machining condition for lessening the boundary wears, which is one of the main factors of the wear of the tool, relatively among alternatives of the plural numbers of the machining conditions mentioned above.

For dissolving such problems to be dissolved as mentioned above, according to the present invention, there is provided a machining condition estimating apparatus, for estimating a machining condition to suppress a wear volume of a tool when conducting cutting work in a work machine, comprising: an analysis model data defining portion, which is configured to define an analysis model presenting shapes of a tool and a cutting material, to be a target of analysis, and various kinds of machining condition parameters relating to relative positions between the tool and the cutting material; an analysis parameter setup portion, which is configured to set up an initial value for use of analysis and change volume of the machining condition parameter as analysis parameters; a tool/cutting material contact geometric calculation portion, which is configured to calculate coordinates "G", at which the cool and the cutting tool of the analysis mode contact, and center coordinates P of the cutting material, for each combination of the analysis parameters set up, and to calculate a position "γi" of a point "i" and contact length "Lci", for each point "i" on a blade edge divided into "N" pieces; a contact condition calculation portion, which is configured to calculate a boundary movement rate "Lr" indicative of a ratio between a contact length "Lb" of a region where the contact length "Lci" changes gradually in accordance with change of "γi", and a maximum contact length "Lt" at a point "i", at which the contact length is longest, and a contact angle "γr" indicative of a ratio between an angle presenting maximum width, over which a tool blade contacts with the cutting material, and a predetermined blade angle, by producing a distribution waveform with plotting the contact length "Lci" for the each point "i" calculated on a chart, presenting "γi" on a horizontal axis and "Lci" on a vertical axis, thereby to memorize in a memory portion; a machining condition searching portion, which is configured to search a machining condition presented by the analysis parameter, with which the boundary movement rate "Lr" reaches come to be maximal, or a machining condition presented by the analysis parameter, with which the contact angle "γr" come to be maximal, from among the boundary movement rates "Lr" or the contact angles "γr", which are calculated for all of combinations of analysis parameters; and an estimation result output portion, which is configured to output the machining condition searched.

Also, for dissolving such problems to be dissolved as mentioned above, according to the present invention, there is also provided a machining condition estimating method, for estimating a machining condition to suppress a wear volume of a tool when conducting cutting work in a work machine, comprising the following steps of: an analysis model data defining step for defining an analysis model presenting shapes of a tool and a cutting material, to be a target of analysis, and various kinds of machining condition parameters relating to relative positions between the tool and the cutting material; an analysis parameter setup step for setting up an initial value for use of analysis and change volume of the machining condition parameter as analysis parameters; a tool/cutting material contact geometric calculating step for calculating coordinates "G", at which the cool and the cutting tool of the analysis mode contact, and center coordinates P of the cutting material, for each combination of the analysis parameters set up, and to calculate a position "γi" of a point "i" and contact length "Lci", for each point "i" on a blade edge divided into "N" pieces; a contact condition calculating step for calculating a boundary movement rate "Lr" indicative of a ratio between a contact length "Lb" of a region where the contact length "Lci" changes gradually in accordance with change of "γi", and a maximum contact length "Lt" at a point "i", at which the contact length is longest, and a contact angle "γr" indicative of a ratio between an angle presenting maximum width, over which a tool blade contacts with the cutting material, and a predetermined blade angle, by producing a distribution waveform with plotting the contact length "Lci" for the each point "i" calculated on a chart, presenting "γi" on a horizontal axis and "Lci" on a vertical axis, thereby to memorize in a memory portion; a machining condition searching step for searching a machining condition presented by the analysis parameter, with which the boundary movement rate "Lr" reaches come to be maximal, or a machining condition presented by the analysis parameter, with which the contact angle "γr" come to be maximal, from among the boundary movement rates "Lr" or the contact angles "γr", which are calculated for all of combinations of analysis parameters; and an estimation result output step for outputting the machining condition searched.

According to the present invention, it is possible to provide a method for estimating a long-life machining method, easily, by estimating the machining condition for enabling to suppress the boundary wears, relatively, within a certain range of the machining condition, in the machining of a cylindrical curved surface by means of the 5-shafts work machine, for example, without applying the database therein.

DETAILED DESCRIPTION OF THE INVENTION

Hereinafter, explanation will be given on embodiments according to the present invention, by referring to the drawings attached herewith.

Embodiment 1

In the present embodiment, explanation will be given on a machining condition estimating apparatus 10 shown in FIG. 1, for estimating machining condition so as to extend a life-time of tools, with suppressing boundary wears of the tools applied in a work machine.

The machining condition estimating apparatus 10 comprises an input portion 20, an output portion 30, a calculating portion 40, a memory portion 50 and a communicating portion 60. The communicating portion 60 is connected with, for example, a work machine 70, a NC controlling apparatus 71, 3D CAD 80, 3D CAM 81, etc., via a network 90.

The calculating portion 40 comprises a tool to be attached on the work machine as a target of analysis, an analysis model data defining portion 41 for providing a user interface, for enabling a user to define model data of a material to be cut (hereinafter, "cutting material") and an initial value/setup region for the machining condition, an analysis parameter setup portion 42 for accepting the user to define the analysis parameter, i.e., a setup value of each machining condition when executing a machining condition estimating process, a tool/cutting material contact geometric calculation portion 43 for calculating a contact point and contact length, etc., between the tool and the cutting material upon basis of geometric calculation; a contact condition calculating portion 44 for calculating a boundary moving rate (will be mentioned later), being a ratio of length of a region, in which the boundary between the blade of the tool and the cutting material is acknowledged of moving, with respect to the maximum contact length, and also a contacting rate (will be mentioned later) indicating a ratio of the width, on which the blade of the tool contacts the cutting material, a machining condition searching portion 45 for searching the analysis parameter, at which the boundary moving rate comes to be the maximum, or the analysis parameter, at which the contact rate comes to be the maximum, while executing the machining condition estimating process at each analysis parameter, and an estimation result output portion 46 for outputting the searched analysis parameter mentioned above and a result of the machining condition estimating process in accordance with an instruction of the user.

The memory portion 50 comprises a memory region 51 to memorize an analysis program therein, for executing each process through loading thereof into the calculating portion, and also initial data to be set for each program, a memory region 52 to memorize analysis model data therein, being a target of analysis, a memory region 53 to memorize a result (s) of conduction of a tool/cutting material contact geometric calculation and/or a contact condition calculation, for each analysis parameter, on an analysis result data table, and further a machining condition estimation result memory region 54 to memorize a result of searching the machining condition therein, with which the boundary wears can be suppressed, searched by the machining condition searching process.

Explanation will be given on an example of an analysis model to be defined in the analysis model data defining portion 41.

Figure 3A:
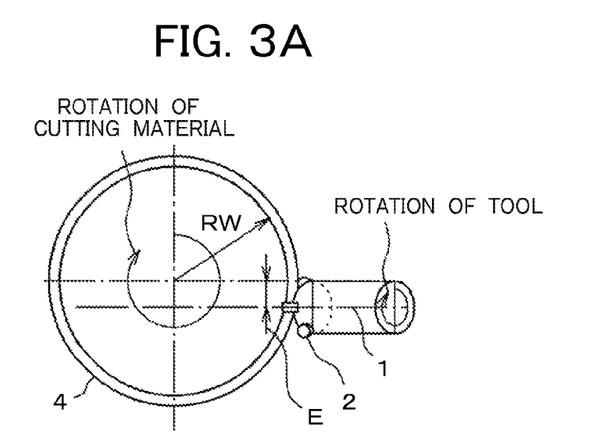
FIGS. 3A to 3C are views for explaining an example of cylindrical curved surface machining by a 5-shafts work machine.
Figure 3B:
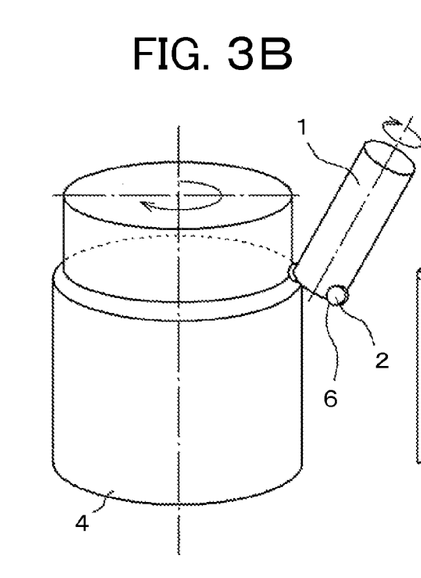
Figure 3C:
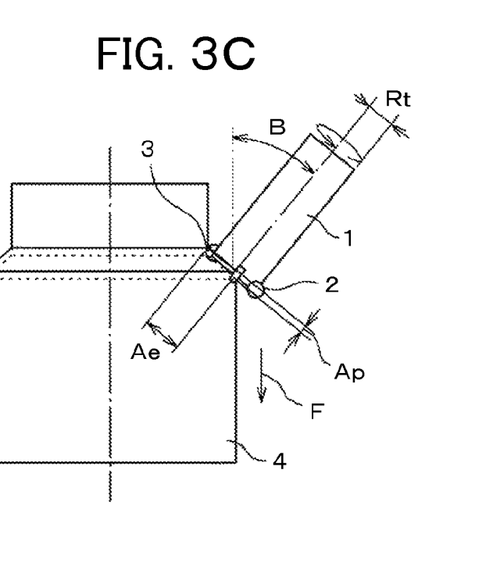

FIGS. 3A to 3C show an example of the analysis model, which defines a relationship between the cutting material 4 and the tool 1, in the 5-shafts work tool for conducting cutting work on the cutting material 4 mounted on a turntable (not shown in the figure), by means of a rotating tool 1.

This is the analysis model of a machining mode of conducting cutting work on an outer periphery of the cutting material 4, along a sending direction "F", by an axial cutting volume "Ap" and a radial cutting volume "Ae", while inclining the tool 1 attached with a blade 2 thereon, having a round barrel-like shape, by a tool inclination angle "B" to the cylindrical cutting material 4, and also setting the tool 1 at a position shifting by an offset volume "E", i.e., a shift volume in the horizontal direction, between a central axis of the cutting material in the vertical direction and a central axis of the tool 1.

In general, boundary wears 5 shown in FIG. 2B, which was pointed out in the brief summary of the present invention mentioned above, progress, greatly, when a boundary portion 3 between the tool 1 and the cutting material 3 lies always at a constant position. For this reason, in the cutting work of the cylindrical curved surface with applying a work machine having plural numbers of degrees of freedom of moving, for example, like the analysis model for conducing the cutting work by the 5-shafts work machine, as is shown in FIGS. 3A to 3C, it is enough to evaluate the moving condition of the boundary portion 3, upon basis of the contact condition between the tool 1 and the cutting material 4, which can be calculated by the geometric calculation, from such a machining condition that the above-mentioned boundary portion 3 between the tool 1 and the cutting material 4 moves always; thus, the tool inclination angle "B", the offset volume "E", the axial cutting volume "Ap" and the radial cutting volume "Ae", as one of means for suppressing the boundary wears mentioned above.

Within the machining condition estimating apparatus 10 according to the present embodiment, the user instructs the analysis model, through a user interface, which is provided by the analysis model data defining portion 41. In accordance with this instruction, for example, material CAD data is inputted from the 3D CAD 80, and tool data is inputted from the 3D CAM 81. Upon basis of those data inputted, the user defines the analysis model by defining a tool, a shape of the cutting material, and also machining parameters. Also, the user sets up, at which value each machining parameter should be determined, or if it should be changed discretely or not, in the form of the analysis parameter with an aid of the analysis parameter setup portion 42. Thereafter, the tool/cutting material contact geometric calculating portion 43 calculates a contacting area or region between the blade 2 of the tool and the cutting material, and then the contact condition calculating portion 44 and the machining condition searching portion 45 calculate the machining condition, under which the boundary portion 3 between the cool 1 and the cutting material 4 can move furthest, or the width comes to the maximum, over which the tool 1 contacts with the cutting material 4, from a result of the geometric calculation mentioned above, and thereby enabling estimation of the machining condition, under which the boundary wears can be suppressed.

Figure 4:
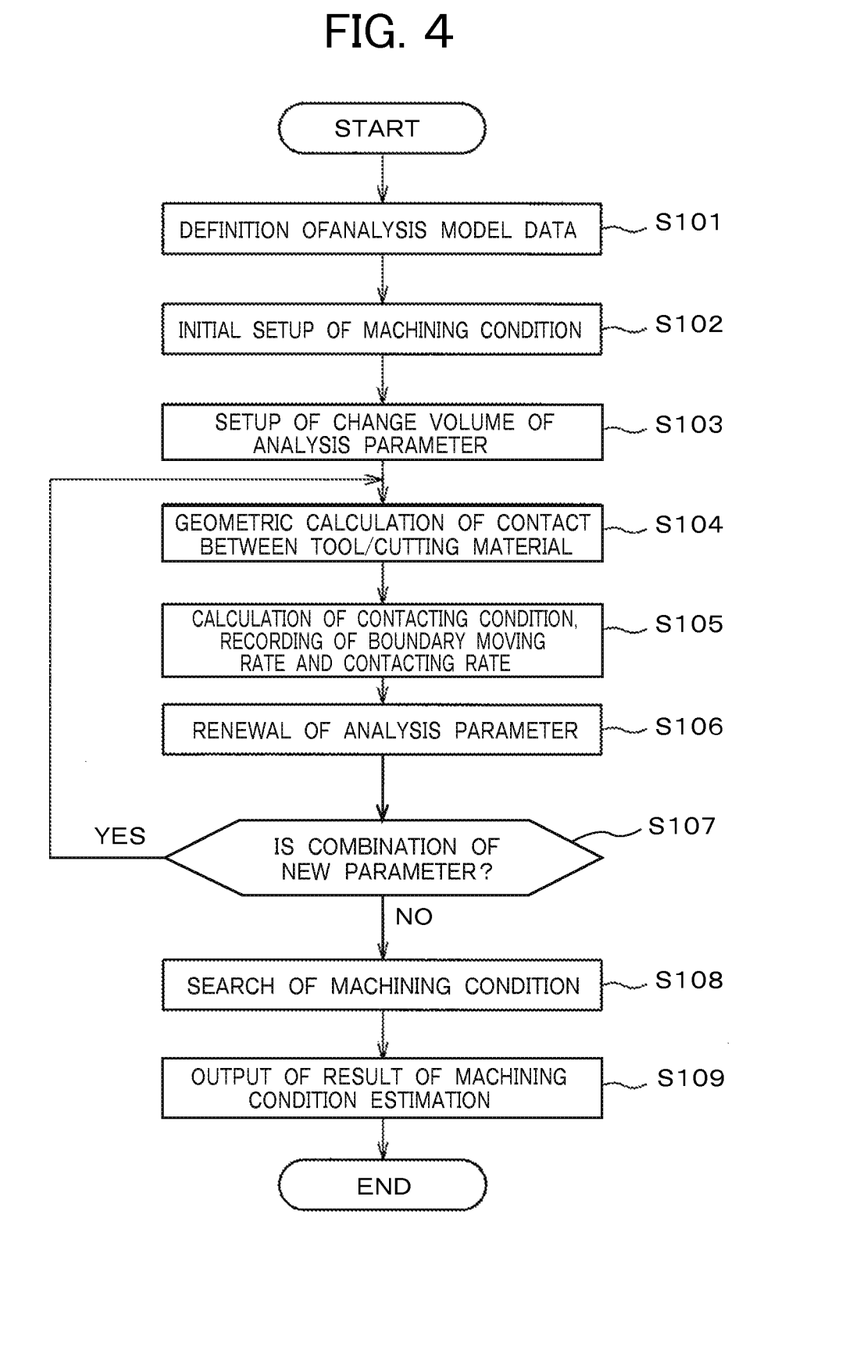
FIG. 4 is a view for showing a flowchart of a machining condition estimating process, according to the present invention.

Hereinafter, explanation will be made on the detailed analysis method of the present embodiment, by referring to an analysis flowchart shown in FIG. 4.

In a step S101, the user inputs an instruction, i.e., an analysis should be applied on the work of which kind of material, with applying which kind of tool therein, and in which work machine, through the user interface, which is provided by the analysis model data defining portion 41. Material CAD data corresponding to that, and tool data presenting a specification of the tool are read out from the 3D CAD 80 and the 3D CAM 81, for example, depending on necessity thereof, to be inputted. Or, alternately, while registering a data table, in advance, they may be selected from that.

Figure 5:
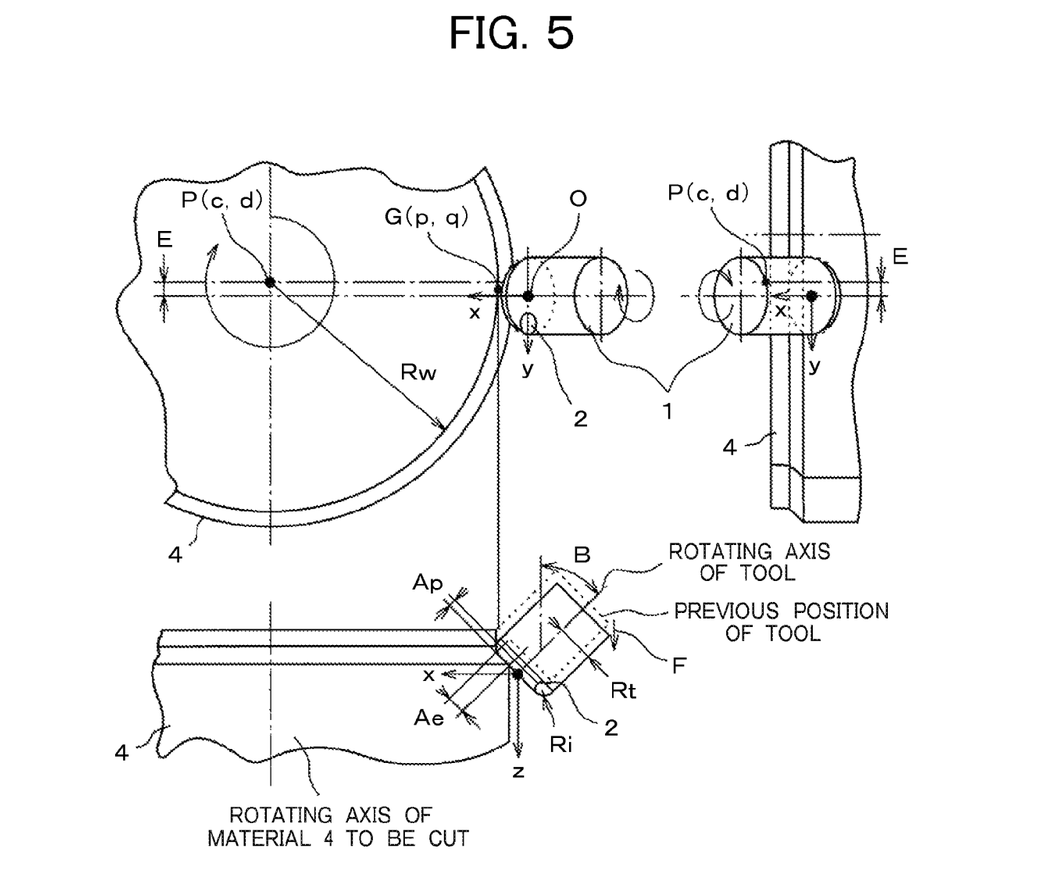
FIG. 5 is an outlook view for explaining an analysis model for the cylindrical curved surface machining by the 5-shafts work machine shown in FIGS. 3A to 3C.

In the present embodiment, a radius of the tool "Rt", a radius of the tool blade "Ri", a (finishing) radius of the cutting material "Rw" and so on are defined, as is shown by the example of the analysis model shown in FIGS. 3A to 3C and also the analysis model, further details thereof will be shown in FIG. 5.

In a step S102, following to the above, the user inputs a range (B0 to Bm) of the tool inclination angle "B" indicative of an inclination of the tool with respect to a rotation central axis of the cutting material 4, a range (E0 to E1) of the offset volume "E" indicative of a shift amount on the horizontal surface from a central axis of the cutting material 4 to a central axis of the tool 1, a range (Ap0 to Apk) of the cutting volume "Ap" indicative of an amount or volume of cutting by the tool into the cutting material in the direction of an axis of the tool, and the machining condition parameter indicated by the radial cut volume "Ae" indicative of an amount or volume of cutting by the tool 1 into the cutting material 4 in the direction perpendicular to the axis of the tool, on the user interface (not shown in the figure), which is provided by the analysis model data defining portion 41. However, those "B", "E", "Ap" and "Ae" are independent parameters, respectively. In the above, the analysis model data, being defined/inputted in the above, is memorized into the analysis model data memory region 52.

In a step S103, through the user interface (not shown in the figure), which is provided by the analysis parameter setup portion 42, the user designates/inputs a way or manner of conducting the analysis; i.e., at which value each machining condition parameter should be set up, concretely, or at a discrete value (the change volume) of which kind of width should be set up for the each machining condition parameter, within the range of the values of the machining condition parameter, which is set in the step S102. For example, within the range of a certain machining condition parameter, a discrete value (a change volume), obtained by equally dividing the range of the value into "n" pieces thereof, may set to be the analysis parameter, or alternately, within the range of the values of other machining condition parameter may be set a fine discrete vale (the change volume), into a part of region within the range, if there is no necessity of checking within the range of all the values, judging from an experience of the past. Or, alternately, it may be determined to be one specific value designated.

The concrete setup value of each machining condition parameter, which the user designates/inputs, is called, the analysis parameter, and is memorized in the analysis model data memory region 52. Each process in steps S104 to S107 following thereto is executed for a combination of all the values of the analysis parameters.

Figure 6:
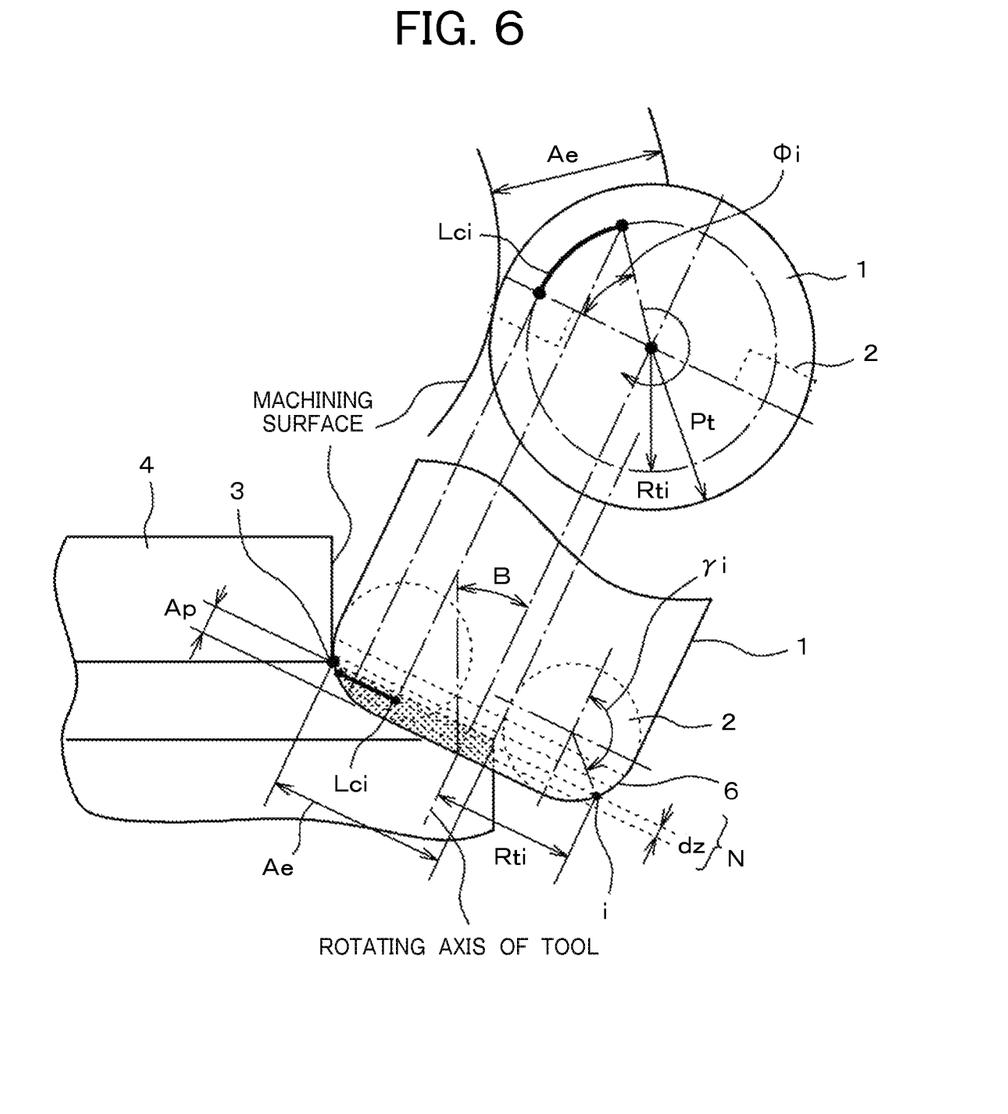
FIG. 6 is an enlarged view of a blade portion of the tool in the analysis model shown in FIG. 5.

In a step S104, the tool/cutting material contact geometric calculating portion 43 calculates coordinates "G(p,q)", at which the tool 1 and the cutting material contact with, and central coordinates "P(p,q)" of the cutting material 4, with respect to an origin "O" at a center of the tool shown in FIG. 5, under the machining condition determined by one combination of the analysis parameters, in other words, inputting one set of analysis parameters into the tool inclination angle "B", the offset volume "E", the cut volume "Ap" and the radial cut volume "Ae" (in the present embodiment, each being set at one fixed value), and in addition thereto, in FIG. 6 showing an enlarged view of the blade 2 shown in FIG. 5, a contact length "Lci", along which a point "i" on the blade edge 6 mentioned above and the cutting material 4 contacts with during one rotation of the tool 1, and "γi" presenting the position of the point "i" by an angle are calculated, for each point "i" on the blade edge 6, which is divided into "N" pieces thereof.

Herein, explanation will be made on the contact point "G(p,q)", at which the cutting material 4 contacts with the tool 1, and also the central coordinates "P(p,q)" of the cutting material 4.

Figure 7:
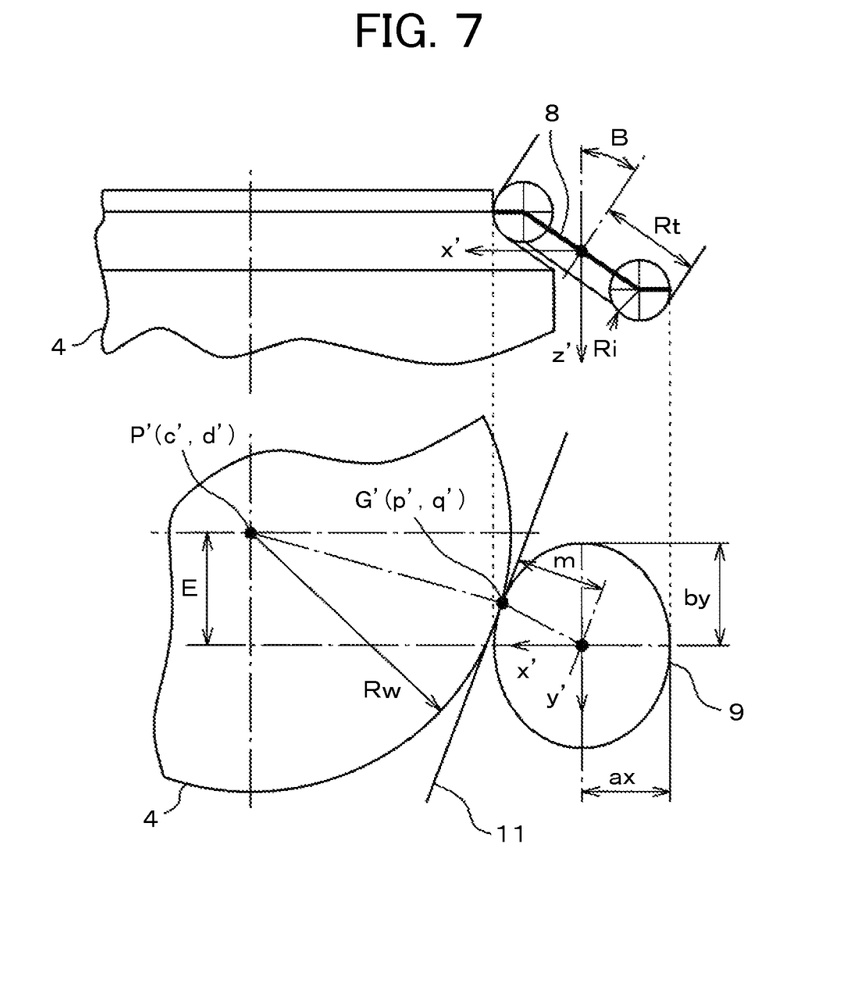
FIG. 7 is a geometric model view when a circle having a radius "Rw" of a cutting material contacts with an ellipse, seeing the outermost peripheral cross-section position of the tool in a direction of z-axis.

FIG. 7 is a view of a geometric model at the time when a circle of the cutting material 4 having radius "Rw" is in contact with an ellipse 9, which is obtained when seeing an outermost cross-section position 8 of the tool in a direction of z-axis. Herein, the circle of the cutting material 4 and the ellipse 9 can be expressed by the following equations, respectively, with respect to a coordinate system "x'", "−y'" and "−z'", the origin "O" of which is determined at the center of the tool:

$$(x'-c')^2+(y'-d')^2=Rw^2 :\text{(circle)} \tag{Eq. 1}$$

$$x'^2/ax^2+y'^2/by^2=1 :\text{(ellipse)} \tag{Eq. 2}$$

where "ax" and "by" present radii of the ellipse 9, respectively, in the longitudinal direction and the shorter direction thereof, and they are determined by the following equations:

$$ax = Ri + (Rt - Ri) \cdot \cos(B) \quad \text{(Eq. 3)}$$

$$by = Rt \quad \text{(eq. 4)}$$

In the calculation, first of all, a dummy or temporal coordinate "q'" is inputted into the (Eq. 2), along the ellipse 9, so as to calculate a coordinate "p'", and thereby obtaining a cross point "G'". Herein, a tangential line 11 can be defined by the following equation, passing through the temporal cross point "G'" mentioned above and being in contact with on the ellipse 9:

$$(p'/ax^2)x' + (q'/by^2)y' = 1 \quad \text{(Eq. 5)}$$

On the other hand, the tangential line can be given by other expression, as below, with using a unit vector "C(g,h)" perpendicular to the tangential line 11:

Assuming $$m = g \cdot x' + h \cdot y', \quad \text{(Eq. 6)}$$

then, the unit vector can be expressed by the following equations:

$$g = (p'/ax^2) \cdot m \quad \text{(Eq. 7)}$$

$$h = (q'/by^2) \cdot m \quad \text{(Eq. 8)}$$

$$m = \sqrt{(g \cdot ax)^2 + (h \cdot by)^2} \quad \text{(Eq. 9)}$$

From the equations from (7) to (9), central coordinates "P'(c',d')" of the circle of the cutting material 4 can be expressed by the following equations, with using "(g,h)":

$$c' = Rw \cdot g + (g \cdot ax^2/m) \quad \text{(Eq. 10)}$$

$$d' = Rw \cdot h + (h \cdot by^2/m) \quad \text{(Eq. 11)}$$

After obtaining the central coordinates "P'" of the cutting material 4 and the contact point "G'", which bring "d'" to be equal to the offset volume "E", which is determined previously, by repeating the calculation mentioned above during "q'=0 to Rt", and after the calculation, "P'" and "G'" are converted into the original coordinate systems "P" and "G"; thereby calculating the central coordinates "P" of the cutting material 4 and the contact point "G".

And then, explanation will be given on a calculating method of the contact length "Lci". In FIG. 6 for showing the tool blade 2 shown in FIG. 5, enlargedly, during the time when the point "i" on the blade edge 6 of the tool 1 turns one round, which is divided into "N" pieces by height "dz", an angle "φi", at which the point "i" contacts on the cutting material 4, and a radius "Rti" from the central axis of the tool at the point "i", are obtained, and with using the "φi" and the "Rti" mentioned above, the contact length "Lci" of the blade, i.e., length, over which the tool contacts on the cutting material 4 during the time when it turns one round, is calculated with applying the following (Eq. 12), for each point "i":

$$Lci = Rti \times \phi i \quad \text{(Eq. 12)}$$

Figure 9:
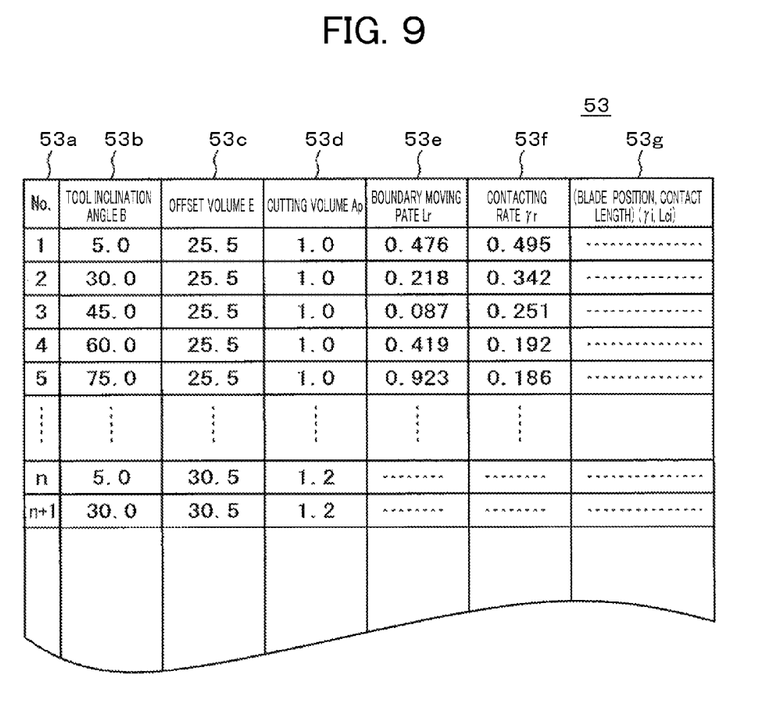
FIG. 9 is a view for explaining an example of the configuration of data items of a analysis result data memory region in a memory portion.

In a step S105, the contact condition calculating portion 44 plots distribution of the position "γi" of the point "i" of the contact length "Lci" mentioned above, and thereby calculating a boundary movement rate "Lr" and a contact rate "γr" to estimate a manner of how it moves on the blade edge 6, and then records the boundary movement rate "Lr" and the contact rate "γr" mentioned above into the analysis result data memory portion 53 of the memory portion shown in FIG. 9, for each "B", "E" and "Ap", respectively.

Figure 8:
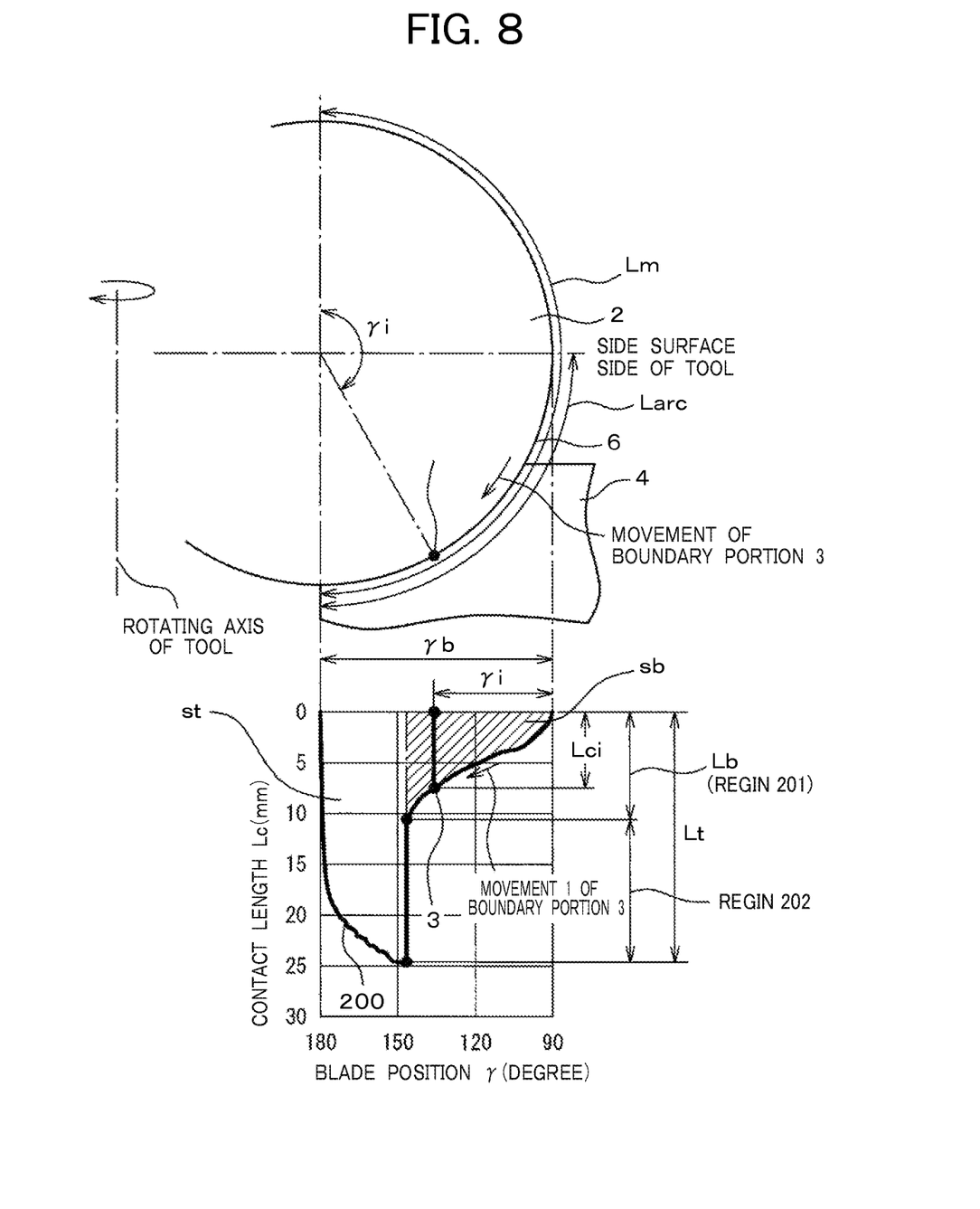
FIG. 8 is a view for explaining a process for calculation of a contact rate "γr", presenting a ratio between a boundary movement rate "Lr", for estimating how much degree of a ratio the length of boundary movement is established with respect to a maximum contact length, and width of a blade of the tool contacting with the cutting material, by producing a waveform of distribution of contact between a blade edge and the cutting material while plotting a position "γi" of a point "i" on the blade edge of the blade and contact length "Lci" thereof.

Explanation will be given on the process within the contact condition calculating portion 44. As is shown in FIG. 8, with applying the contact length "Lci" and the position "γi" at the point "i" on the blade edge 6 of the blade 2, which are calculated in the step 104 mentioned above, while taking "γi" on the horizontal axis and "Lci" on the vertical axis on a calculating machine, those "γi" and "Lci" are plotted for each "i", thereby producing a distributing wavelength 200 of contact between the blade edge 6 and the cutting material 4. In the same figure, in a region 201 where the contact length "Lci" gradually changes in accordance with change of "γi", i.e., the region where the boundary portion 3 between the tool 1 and the cutting material 4 gradually moves accompanying with rotation of the tool, and the boundary wears come to be small. On the contrary, since a region 202 where a plotting point reaches to plural numbers thereof, each differing from in the contact length "Lci", at the position, at which the position "γi" of the point "i" is same, is a region where the position of the same blade edge lies always on the boundary portion 3, and this presents the region where the boundary wear comes to be large. Also, "Lt" presents the maximum contact length at the point "i", at which the contact length comes to longest during the time when the tool rotates one round, "Lb" the movement length of the boundary portion indicative of the maximum length within the region 201 mentioned above, "γb" the maximum contact angle, at which the tool 1 contacts with the cutting material 4, respectively. Herein, since the boundary portion 3 between the tool blade and the cutting material moves on a line of the waveform 200 shown in the same figure, and passes through the regions 201 and 202 mentioned above, it is possible to estimate the moving condition of the boundary portion 3 between the tool and the cutting material, with applying the waveform shown in the same figure, which is produced within the contact condition calculating portion 44.

In more details thereof, within the contact condition calculating portion 44 are calculated the boundary movement rate "Lr", for estimating at which degree of ratio takes the movement length of the boundary portion "Lb", i.e., the length of the region 21 where the boundary moves, with respect to the maximum contact length "Lt" mentioned above, with applying those "Lt" and "Lb" mentioned above, and also the contact rate "γr" indicative of a ratio of the width, over which the tool blade contacts with the cutting material, with applying "γb" mentioned above, by using the following (Eq. 13) and (Eq. 14):

$$Lr = Lb/Lt \quad \text{(Eq. 13)}$$

$$\gamma r = \gamma b / 180° \quad \text{(Eq. 14)}$$

Where "Lr" and "γr" are both non-dimensional volumes, and then the estimation can be made in the similar estimation scale, even under the condition differing from of the cutting material radius "Rw" and the tool radius "Rt". Also, this means, the larger the values of "Lr" and "γr", the further the boundary moves or the wider the contact extends, and leads up to suppression of wears of the tool.

However, although the "Lr" mentioned above is defined by (Eq. 13), but it may be estimated by the following (Eq. 15), applying the distribution waveform 200 shown in FIG. 8, for example, i.e., applying an area "Sb" of only a total contacting area "St" (i.e., an area of a region surrounded by the distribution waveform 200 and a coordinate axis of the contact length "Lc"=0) and the boundary movement portion:

$$Lr = Sb/St \tag{Eq. 15}$$

Also, "γr" has a denominator of 180°, but an angle to be a reference may be any kind, as far as it is a unit of angle; however in case of the round barrel-shape tool, since it hardly happens to contact with the cutting material by a half or more than that thereof, 180° is applied in the present embodiment, for example. Also, for "γr", not only the angle, may be applied an estimation index, which is non-dimensionized to the length, like the following (Eq. 16), applying length "Lm" for a halfway round of the tool with respect to a contact arc length "Larc" shown in FIG. 8, over which the blade 2 and the cutting material 4 contact with:

$$\gamma r = Larc/Lm \tag{Eq. 16}$$

A calculation result in the step S105 is memorized in the analysis result data memory portion 53 of the memory portion 50. FIG. 9 shows an example of the analysis result data memory portion 53. In the present embodiment, since the analysis parameter is constructed with by changing the machining condition thereof, such as, the tool inclination angle "B", the offset volume "E" and the cut volume "Ap", the calculation results of the boundary movement rate "Lr" and the contact rate "γr" are stored corresponding to one set of analysis parameters (B, E, Ap), and further are memorized all of the plotted coordinate values of "γr" for presenting the positions of the point "i" by angle, and the contact lengths "Lci" during the time when the tool 1 rotes one round, for each point "i" on the blade edge 6 divided into "N" pieces thereof, which are calculated in the step S104.

In a step S106 are selected analysis parameters, if there is any one of new combination thereof not yet selected, and then the analysis parameters are renewed.

In a step S107, if there is a new combination of the analysis parameters, the process is shifted to the step S104, thereby to repeat the processes mentioned above. If there is no new combination, in other words, if completing the analyzing process of all the analyzing parameters, then the process is shifted to a step S108.

In a step S108, the boundary movement rate "Lr" and the contact rate "γr" mentioned above for each analysis parameter, which are recorded in the analysis result data memory portion 53 of the memory portion 50, are read out, to be plotted to "γr" (the horizontal axis) and "Lr" (the vertical axis) on a calculating machine. And, search is made on the machining condition (the analysis parameters), under which the "γr" or "Lr" comes to the maximum thereof.

Figure 10:
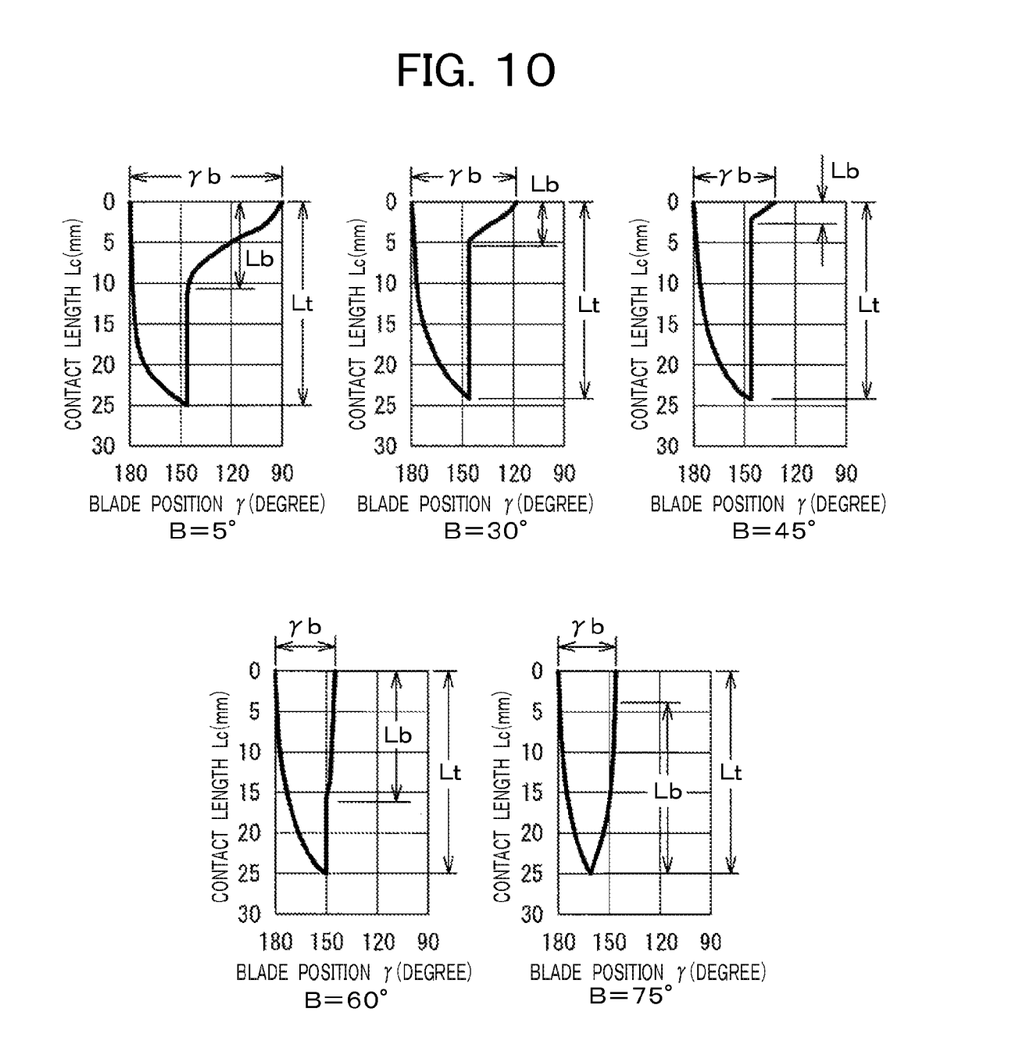
FIG. 10 is a view for explaining plotting of contact condition at the point "i" on the blade edge of the blade, for each combination of analysis parameter.
Figure 11:
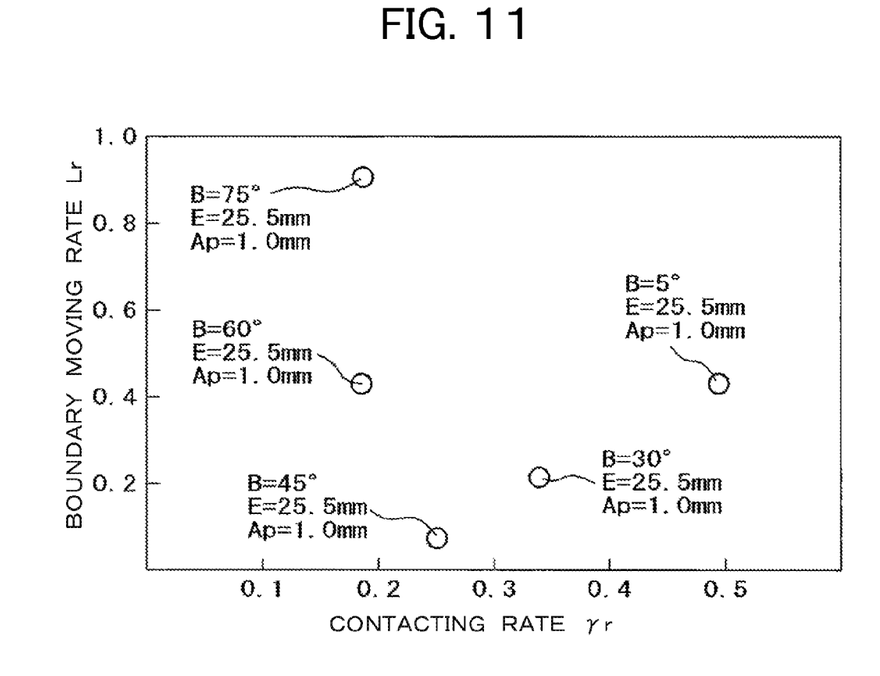
FIG. 11 is a view for showing an example of display of a boundary movement rate "Lr" and a contact rate "γr", each of which is calculated for each analysis parameter, being plotted on a distribution chart having the boundary movement rate "Lr" and the contact rate "γr" as both coordinate axes thereof.

FIG. 10 shows a result of calculating/estimating the maximum contact length "Lt", the boundary movement length "Lb" and the contact angle "γr", within the tool/cutting material contact geometric calculating portion 43 and the contact condition calculating portion 44, while fixing the tool radius "Rt"=31.5 mm, a tip radius of the round barrel-shaped blade "Ri"=6 mm, the radial cutting volume "Ae"=15 mm, and the axial cutting volume "Ap"=1 mm, and setting them as the analysis parameters of the tool inclination angles "B"=5, 30, 45, 60 and 75°. From this result, the present embodiment of plotting the boundary movement rate "Lr" and the contact rate "γr" for each analysis parameter (the machining condition) are as shown in FIG. 11. In the present embodiment, the boundary movement rate "Lr" reaches to the maximum thereof, at "B"=75°, and the contact rate "γr" reaches to the maximum thereof, at "B"=5°, then it can be estimated that the machining condition for reducing the tool wears is "B"=5° or "B"=75°.

Machining test is practiced, actually, on the Ni-group alloys in the machining mode of the present embodiment shown in FIGS. 3A to 3C, and then boundary wear volumes "VB" measured thereon are as follows: i.e., (B=5°, VB=0.74 mm), (B=30°, VB=2.4 mm), (B=45°, VB=4.7 mm), (B=60°, VB=2.8 mm) and (B=75°, VB=1.2 mm). This result shows that the boundary wear volume come to be small at B=5° or B=75°, as is expected by the present invention, and the tool wear volume can be suppressed down to a half or lower than that, comparing to that under the machining condition of B=45° where the boundary wear is the largest, and that the machining condition for achieving a long life-time can be calculated.

In a step S109, the machining condition (the analysis parameters), under which the boundary movement rate "Lr" or the contact rate "γr" calculated in the previous step S108 reaches to the maximum, is memorized in the machining condition estimation result memory portion 54, as an estimated result of the machining condition, under which the tool wear can be suppressed down, and it is outputted to the output portion 30 to be displayed thereon.

On the output portion 30 are displayed a distribution chart of the contact rate "γr" and the boundary movement rate "Lr" shown in FIG. 11, and also a tool inclination angle "Bopt", an offset volume "Eopt" and a cutting volume "Apopt", with which the "Lr" or "γr" mentioned above reaches to the maximum. Also, upon a display instruction made by the user, it is possible to produce a chart, by reading out the chart, on which "Lci" and "γi" are plotted for each point "i", while presenting the position "γi" on the horizontal axis and the contact length "Lci" on the vertical axis, respectively, corresponding to each analysis parameter shown in FIG. 10, in the form of data, from a (blade position, contact length) column 53g in the analysis result data memory region 53.

The machining condition data, which is memorized in the machining condition estimation result memory portion 54, thereafter, is downloaded to the work machine 70, the NC controlling apparatus 71 and/or the 3D CAM 81, to be applied therein, when executing the mechanical machining or when producing NC program.

The above mentioned is a flow of the analysis process as a whole, to be executed in the machining condition estimating apparatus 10.

From the analysis and the experimental result mentioned above, it is possible to reduce the tool wears and to estimate the long life-time machining condition, easily, by estimating the boundary movement rate and the contact rate from the tool, the shape of the cutting material and further the machining condition, but without obtaining fundamental database for calculating an absolute value of lifetime of the tool, in the curved-surface machining by means of the 5-shafts work machine, with applying the machining condition estimating apparatus 10 according to the present invention therein.

Figure 1:
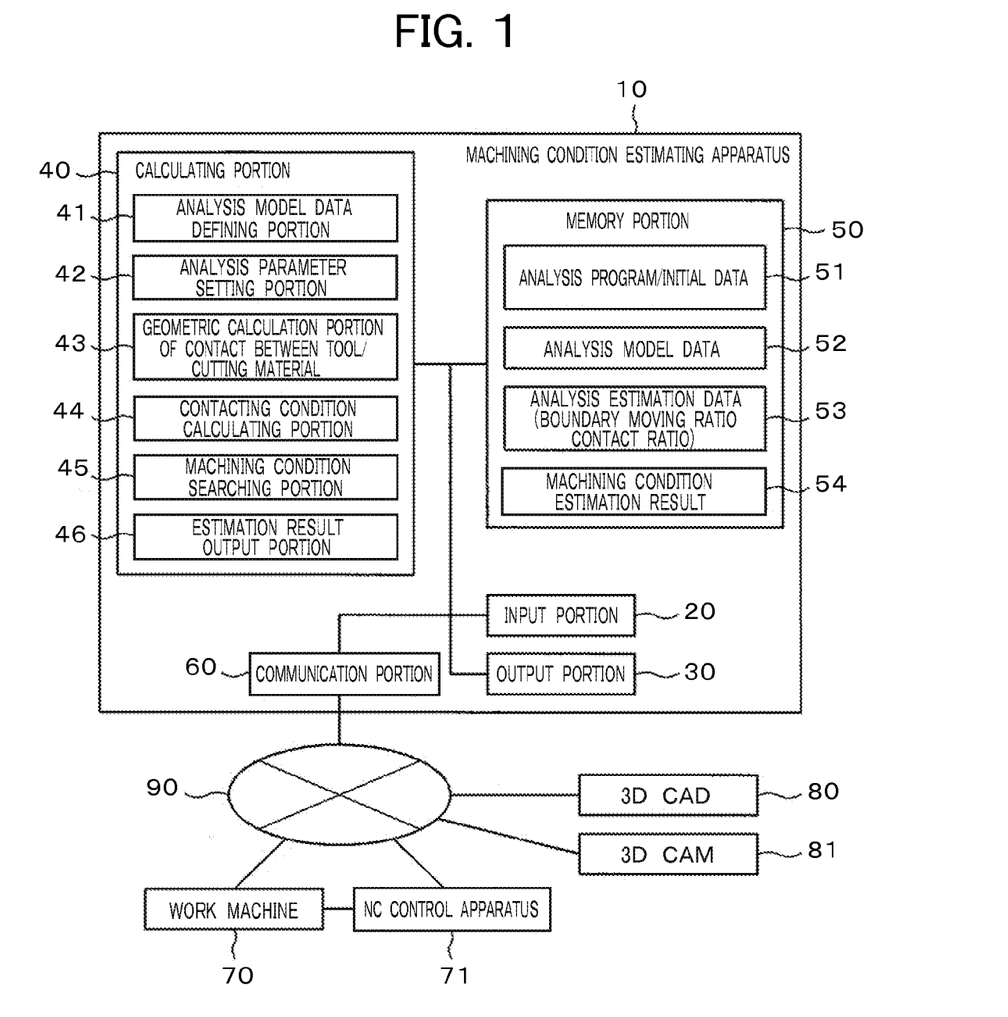
FIG. 1 is a view for showing the configuration of a machining condition estimating apparatus, according to an embodiment 1 of the present invention.

With each of the functions of the machining condition estimating apparatus 10 of the present embodiment, there can be considered such a configuration that it is achieved within the 3D CAM 81, the work machine 70 or the NC controlling apparatus 71, for example, but not only the case where it is built up on a single apparatus as is shown in FIG. 1.

What is claimed is:
1. A machining condition estimating apparatus, for estimating a machining condition to suppress a wear volume of a tool when conducting cutting work in a work machine, comprising:

an analysis model data defining portion stored in a memory, which is configured to define an analysis model presenting shapes of a tool and a cutting material, to be a target of analysis, and various kinds of machining condition parameters relating to relative positions between the tool and the cutting material;

an analysis parameter setup portion, which is configured to set up an initial value for use of analysis and change volume of the machining condition parameter as analysis parameters;

a tool/cutting material contact geometric calculation portion, which is configured to calculate coordinates "G", at which the tool and the cutting tool of the analysis mode contact, and center coordinates P of the cutting material, for each combination of the analysis parameters set up, and to calculate a position "γi" of a point "i" and contact length "Lci", for each point "i" on a blade edge divided into "N" pieces;

a contact condition calculation portion, which is configured to calculate a boundary movement rate "Lr" indicative of a ratio between a contact length "Lb" of a region where the contact length "Lci" changes gradually in accordance with change of "γi", and a maximum contact length "Lt" at a point "i", at which the contact length is longest, and a contact angle "γr" indicative of a ratio between an angle presenting maximum width, over which a tool blade contacts with the cutting material, and a predetermined blade angle, by producing a distribution waveform with plotting the contact length "Lci" for the each point "i" calculated on a chart, presenting "γi" on a horizontal axis and "Lci" on a vertical axis, thereby to memorize in a memory portion;

a machining condition searching portion, which is configured to search a machining condition presented by the analysis parameter, with which the boundary movement rate "Lr" reaches come to be maximal, or a machining condition presented by the analysis parameter, with which the contact angle "γr" come to be maximal, from among the boundary movement rates "Lr" or the contact angles "γr", which are calculated for all of combinations of analysis parameters, and an estimation result output portion, which is configured to output the machining condition searched.

2. The machining condition estimating apparatus, as described in the claim 1, wherein the machining condition parameters are a tool inclination angle "B" with respect to a central axis of rotation of the cutting material, an offset volume "E" between a central axis of the cutting material and a central axis of the tool, an axial cutting volume "Ap" and a radial cutting volume "Ae".

3. The machining condition estimating apparatus, as described in the claim 1, wherein the estimation result output portion displays the boundary movement rate "Lr" and the contact rate "γr", which are calculated for each analysis parameter, by plotting those on a distribution chart, having the contact angle "γr" and the boundary movement rate "Lr", as both axes of coordinates thereof.

4. The machining condition estimating apparatus, as described in the claim 1, wherein the estimation result output portion displays a distribution waveform, plotting "Lci" and "γi" for each point "i" on a distribution chart, having the position "γi" and the contact length "Lci", as both axes of coordinates thereof, corresponding to the analysis parameters, display of which is designated by a user.

5. The machining condition estimating apparatus, as described in the claim 1, wherein the contact rate "γr" calculated in the contact condition calculation portion is calculated to be a volume dimensionless, by taking a ratio of an angle, over which the blade contact with the cutting material, to an angle of a half round of the blade.

6. A processor-executed machining condition estimating method, for estimating a machining condition to suppress a wear volume of a tool when conducting cutting work in a work machine, comprising the following steps of:

an analysis model data defining step for defining an analysis model presenting shapes of a tool and a cutting material, to be a target of analysis, and various kinds of machining condition parameters relating to relative positions between the tool and the cutting material;

an analysis parameter setup step for setting up an initial value for use of analysis and change volume of the machining condition parameter as analysis parameters;

a tool/cutting material contact geometric calculating step for calculating coordinates "G", at which the tool and the cutting tool of the analysis mode contact, and center coordinates P of the cutting material, for each combination of the analysis parameters set up, and to calculate a position "γi" of a point "i" and contact length "Lci", for each point "i" on a blade edge divided into "N" pieces;

a contact condition calculating step for calculating a boundary movement rate "Lr" indicative of a ratio between a contact length "Lb" of a region where the contact length "Lci" changes gradually in accordance with change of "γi", and a maximum contact length "Lt" at a point "i", at which the contact length is longest, and a contact angle "γr" indicative of a ratio between an angle presenting maximum width, over which a tool blade contacts with the cutting material, and a predetermined blade angle, by producing a distribution waveform with plotting the contact length "Lci" for the each point "i" calculated on a chart, presenting "γi" on a horizontal axis and "Lci" on a vertical axis, thereby to memorize in a memory portion;

a machining condition searching step for searching a machining condition presented by the analysis parameter, with which the boundary movement rate "Lr" reaches come to be maximal, or a machining condition presented by the analysis parameter, with which the contact angle "γr" come to be maximal, from among the boundary movement rates "Lr" or the contact angles "γr", which are calculated for all of combinations of analysis parameters; and an estimation result output step for outputting the machining condition searched.

7. The machining condition estimating method, as described in the claim 6, wherein the machining condition parameters are a tool inclination angle "B" with respect to a central axis of rotation of the cutting material, an offset volume "E" between a central axis of the cutting material and a central axis of the tool, an axial cutting volume "Ap" and a radial cutting volume "Ae".

8. The machining condition estimating method, as described in the claim 6, wherein the boundary movement rate "Lr" and the contact rate "γr", which are calculated for each analysis parameter, are displayed, by plotting those on a distribution chart, having the contact angle "γr" and the boundary movement rate "Lr", as both axes of coordinates thereof, in the estimation result outputting step.

9. The machining condition estimating method, as described in the claim 6, wherein a distribution waveform, plotting "Lci" and "γi" for each point "i" are displayed on a distribution chart, having the position "γi" and the contact length "Lci", as both axes of coordinates thereof, corresponding to the analysis parameters, display of which is designated by a user, in the estimation result outputting step.

10. The machining condition estimating method, as described in the claim 6, wherein the contact rate "γr" calculated in the contact condition calculating step is calculated to be a volume dimensionless, by taking a ratio of an angle, over which the blade contact with the cutting material, to an angle of a half round of the blade.

* * * * *